US008998169B2

(12) United States Patent
Kaegi

(10) Patent No.: US 8,998,169 B2
(45) Date of Patent: Apr. 7, 2015

(54) TOOTHED GATE VALVE SEAT

(75) Inventor: Ulrich Kaegi, Winterthur (CH)

(73) Assignee: Control Components, Inc., Rancho Santa Margarita, CA (US)

(*) Notice: Subject to any disclaimer, the term of this patent is extended or adjusted under 35 U.S.C. 154(b) by 250 days.

(21) Appl. No.: 13/403,135

(22) Filed: Feb. 23, 2012

(65) Prior Publication Data

US 2012/0216897 A1 Aug. 30, 2012

Related U.S. Application Data

(60) Provisional application No. 61/447,633, filed on Feb. 28, 2011.

(51) Int. Cl.

*F16K 47/00* (2006.01)
*F16K 3/02* (2006.01)
*F15C 1/16* (2006.01)

(52) U.S. Cl.

CPC ........................................ *F15C 1/16* (2013.01)

(58) Field of Classification Search

CPC ........... F16K 47/08; F16K 47/00; F15C 1/16; F01D 17/45
USPC ........... 251/126, 118, 326, 327, 328; 137/808
See application file for complete search history.

(56) References Cited

U.S. PATENT DOCUMENTS 114,725 A * 5/1871 Strehli .......................... 251/328
683,695 A * 10/1901 Lundbom ..................... 251/328
855,385 A * 5/1907 Churchill ...................... 403/288
2,649,273 A * 8/1953 Honegger ..................... 251/126
2,923,284 A 2/1960 Sullivan
2,944,623 A * 7/1960 Bodine, Jr. .................... 181/213
3,333,414 A * 8/1967 Saintsbury ....................... 60/756
3,703,273 A * 11/1972 Illing ............................ 251/122
3,791,618 A * 2/1974 Nelson et al. ................... 251/37
4,217,756 A * 8/1980 Laskody .......................... 60/262
4,375,939 A * 3/1983 Mount et al. .................. 415/157
4,506,860 A 3/1985 von Schwerdtner et al.
4,688,755 A * 8/1987 Pluviose ....................... 251/121
4,892,118 A * 1/1990 Davis et al. ................ 137/625.3
4,911,407 A * 3/1990 Paul, Jr. ........................ 251/172
5,150,736 A * 9/1992 Vincent de Paul et al. .......................... 137/625.3
5,931,445 A * 8/1999 Dvorak et al. ................ 251/118
5,964,446 A 10/1999 Walton et al.
6,260,530 B1 7/2001 Keon, Jr.
6,817,594 B2 * 11/2004 Pierce ........................... 251/359
7,131,514 B2 * 11/2006 Choi et al. .................... 181/270
7,144,515 B2 * 12/2006 Brosemer ...................... 210/787
7,513,924 B2 * 4/2009 French et al. ................ 55/459.1

(Continued)

OTHER PUBLICATIONS

PCT Search Report and Written Opinion for PCT/US2012026447 issued May 25, 2012.

*Primary Examiner* — John K Fristoe, Jr.
*Assistant Examiner* — David Colon Morales
(74) *Attorney, Agent, or Firm* — Stetina Brunda Garred & Brucker

(57) ABSTRACT

In accordance with the present invention, there is provided is a fluid control valve configured to attenuate acoustic resonance generated by a fluid flow. The fluid control valve includes a valve body defining a fluid passageway. A pair of seat rings are coupled to the valve body, with each seat ring defining an opening disposed about the fluid passageway. Each seat ring includes a plurality of vortex generators disposed about the radial periphery thereof for generating streamwise vorticies which suppress acoustic resonance.

20 Claims, 9 Drawing Sheets

(56) References Cited

U.S. PATENT DOCUMENTS

| | | | | |
|---|---|---|---|---|
| 8,069,647 | B2 * | 12/2011 | Anderson | 60/204 |
| 2003/0038270 | A1 | 2/2003 | Pierce | |
| 2005/0151107 | A1 | 7/2005 | Shu | |
| 2008/0264719 | A1 * | 10/2008 | Seko et al. | 181/229 |
| 2009/0026395 | A1 * | 1/2009 | Perrault et al. | 251/127 |
| 2010/0206665 | A1 * | 8/2010 | McGregor | 181/261 |

* cited by examiner

TOOTHED GATE VALVE SEAT

CROSS-REFERENCE TO RELATED APPLICATIONS

This application claims the benefit of U.S. Provisional Application No. 61/447,633, filed Feb. 28, 2011.

STATEMENT RE: FEDERALLY SPONSORED RESEARCH/DEVELOPMENT

Not Applicable

BACKGROUND OF THE INVENTION

1. Technical Field of the Invention

The present invention relates generally to an isolation valve and, more specifically, to a gate valve for controlling steam flow, wherein the gate valve is equipped with a toothed seat ring to induce vortices within the fluid flow for suppressing acoustic resonance.

2. Description of the Related Art

Gate valves are typically used to shut off fluid flows. Fluids flowing through the open valve may be liquid or gaseous. Gate valves typically consist of a valve body defining a fluid passageway, two valve seats with one being located on the upstream side of the valve and the other being located on the downstream side of the valve, and a system of shut off plates which generally move in an axial direction perpendicular to the fluid flow to shut off the fluid flow. The plates typically engage with the seat to form a fluid tight shut off. The valve is generally opened by retracting the plates away from the seat and out of the fluid flow. In an open position, the plates are typically completely moved out of the fluid flow.

When the gate valve is in the open position, fluid may be flowing at a high velocity through the valve. Due to the nature of its design, acoustic resonance may occur in the side cavities of the valve, which may cause pressure pulsations in the cavities. The acoustic resonance may be excited by shear layer instability at the gaps between the seats and between the seats and the disks. This phenomenon includes the periodic formation of vorticies, which travel across the gap and impinge on the trailing edge of the side branch cavity, therefore generating a pressure pulsation.

These pressure pulsations may excite pressure pulsations in the piping, which in turn may produce vibrations within the structural components defining the fluid flow system (i.e., pipes, fittings, valves, connectors, etc.), which over time, may weaken the structural integrity of the system. For instance, the acoustic resonance may cause a crack to develop within the pipe wall.

Another drawback associated with acoustic resonance is the sound associated therewith. The sound may not only be an annoyance and safety hazard to those working at the nuclear power plant, but may also interfere with the operation of the plant (i.e., the noise may make it difficult for workers to communicate).

As is apparent from the foregoing, there is a need in the art for a fluid control device configured to attenuate resonance generated within a fluid system. These, as well as other features and advantages of the present invention will be described in more detail below.

BRIEF SUMMARY OF THE INVENTION

In accordance with the present invention, there is provided a gate valve configured to attenuate acoustic resonance generated by a fluid flow. The fluid control valve includes a valve body defining a fluid passageway. At lease one and preferably a pair of seat rings are coupled to the valve body or are an integral part of the valve body, with each seat ring defining an opening disposed about or circumventing the fluid passageway. Each seat ring includes a plurality of vortex generators radially disposed about the inner periphery thereof for generating streamwise vorticies within the fluid flow to suppress acoustic resonance within the fluid flow system. A valve gate assembly with a pair of valve plates is coupled to a valve stem which moves in an axial direction perpendicular to the fluid flow. The valve plates are engageable with the seat rings to create a fluid tight engagement therebetween to close the valve. The valve may be opened by retracting the valve plates away from the seat rings.

The vortex generators may be of various shapes and sizes, each being associated with a respective vortex profile. For instance, the vortex generators may include fin type vortex generators, hump type vortex generators or groove type vortex generators. In addition, the size, number, and spacing between the vortex generators may be varied to define numerous flow characteristics.

The present invention is best understood in reference to the following detailed description when read in conjunction with accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
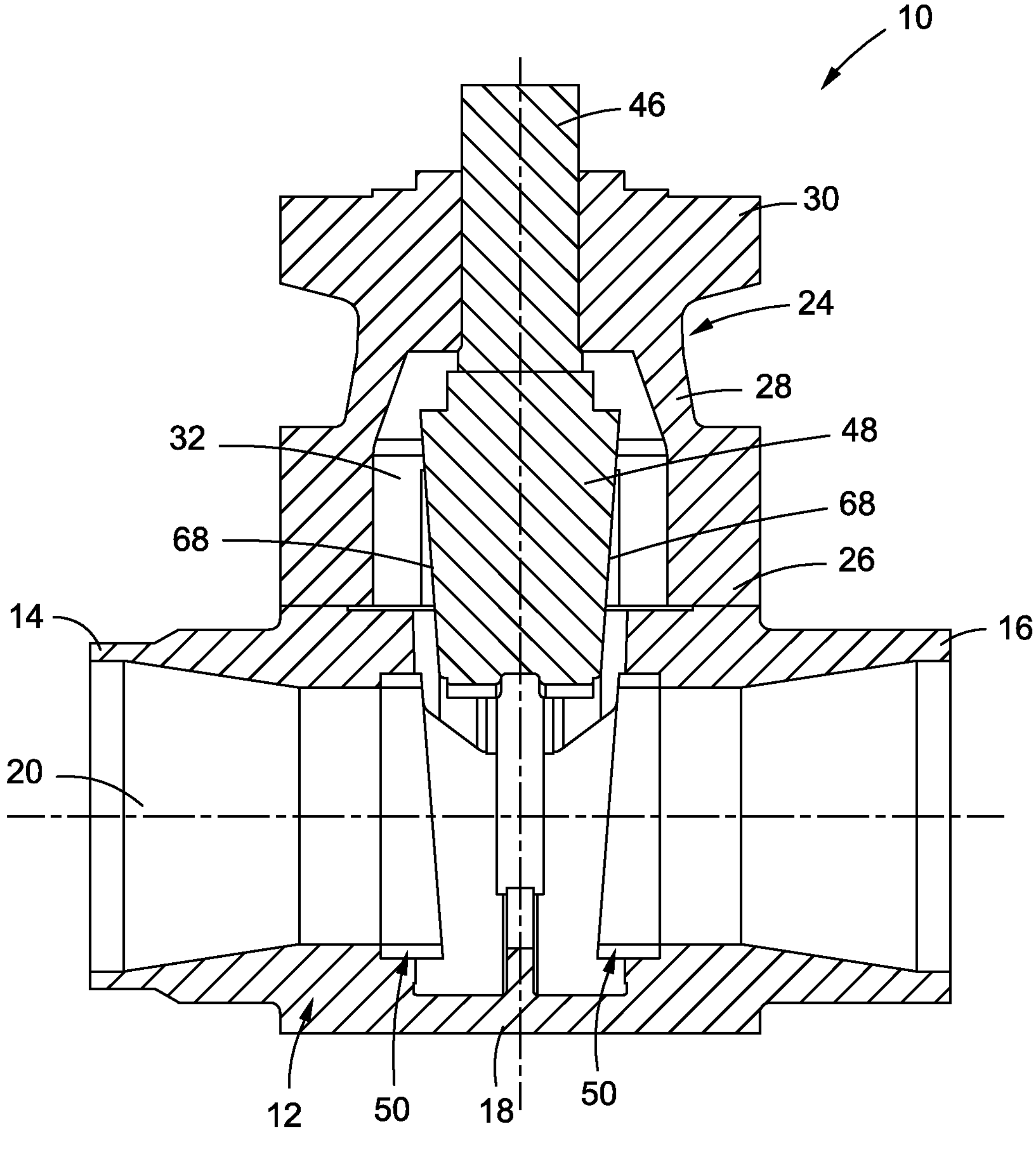
FIG. 1 is a side cross sectional view of a gate valve.

Referring now to the drawings wherein the showings are for purposes of illustrating preferred embodiments of the present invention only, and not for purposes of limiting the same, there is depicted a gate valve specifically configured to attenuate resonance resulting from the flow of steam through the gate valve. As described in more detail below, the gate valve includes seat rings defining an opening disposed about or circumventing the fluid flow, wherein the seat rings include vortex generators disposed about the inner periphery thereof. The vortex generators induce streamwise vortices within the fluid flow to attenuate the acoustic resonance which may be generated by the fluid flow.

Referring now specifically to FIGS. 1-4, there is shown an exemplary gate valve 10 for use in a steam line, including but not limited to, a steam line in a nuclear power generator. Those skilled in the art will understand that the valve 10 may also be used in the fossil, oil and gas, petroleum, as well as other industries. The gate valve 10 is operative to shut off the steam pipe.

Those skilled in the art will appreciate that the following discussion applies to all gate valves, including system medium operated gate valves, and is not limited to the particular embodiment depicted in the Figures. In this regard, the gate valve 10 is exemplary in nature only and is not intended to limit the scope of the present invention.

FIG. 1 is a side sectional view of the gate valve 10, illustrating the internal components of the valve 10. The valve 10 includes a valve body 12 defining a first end portion 14, an opposing second end portion 16 and a medial portion 18 disposed between the first and second end portions 14, 16. A fluid passageway 20 extends between the first end portion 14 and the second end portion 16 and includes a substantially circular cross section in a plane orthogonal to the direction of flow. In the exemplary embodiment shown in FIG. 1, the diameter of the fluid passageway 20 is greatest at the first and second end portions 14, 16 and tapers to a minimum at the medial portion 18.

The valve body 12 includes a valve body opening 22 (see FIG. 4) adjacent the medial portion 18. The valve body opening 22 is disposed about an axis that is substantially orthogonal to the direction of fluid flow and provides access to the fluid passageway 20. A valve bonnet 24 is connected to the valve body 12 and is disposed about the valve body opening 22. The valve bonnet 24 includes a first end portion 26, a middle portion 28, and a second end portion 30. The valve bonnet 24 defines a central opening 32 extending from the first end portion 26 to the second end portion 30. The valve bonnet 24 is connected to the valve body 12 such that the central opening 32 communicates with the valve body opening 22. In the embodiment depicted in FIG. 1, the valve body opening 22 and the central opening 32 are coaxially disposed relative to each other. As will be described in more detail below, the central opening 32 is configured to receive valve plates adjacent the first end portion 26 (where the diameter is larger) when the valve 10 is in the open position. The central opening 32 leads at the top of the bonnet 24 into a bore which guides the valve stem 46, which is described in more detail below.

The valve 10 further includes a valve gate assembly including the axial valve stem 46 and one or more valve plates 48. FIG. 1 shows a single valve plate 48; however, those skilled in the art will appreciate that the valve plate 48 may be comprised of a pair of valve plate halves. The valve gate assembly is configured to move relative to the valve bonnet 24 and valve body 12 between an open position to allow fluid to flow through the fluid passageway 20, and a closed position, wherein the valve plate 48 is disposed within the fluid passageway 20 and engage with seat rings 50 to restrict fluid flow through the valve 10. The valve gate assembly is moved between the open position and the closed position by an actuator through the stem 46.

Figure 2:
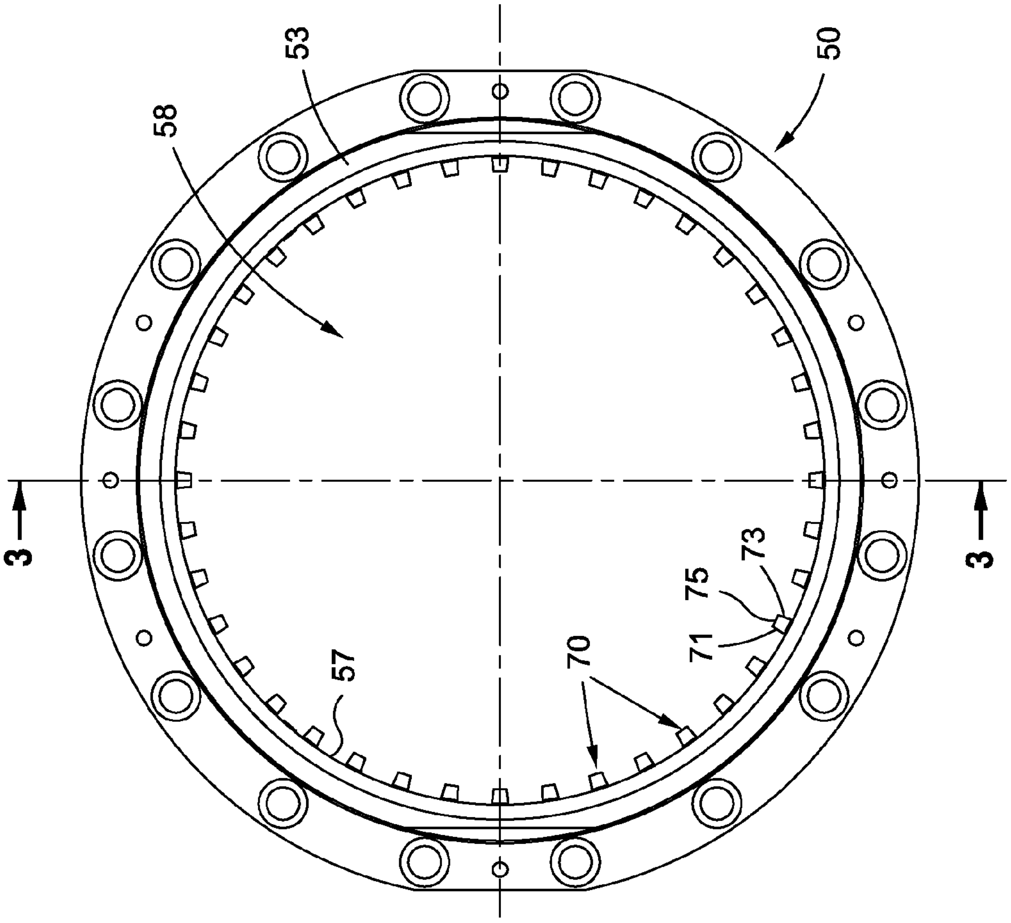
FIG. 2 is a front view of a seat ring used in the gate valve shown in FIG. 1.
Figure 3:
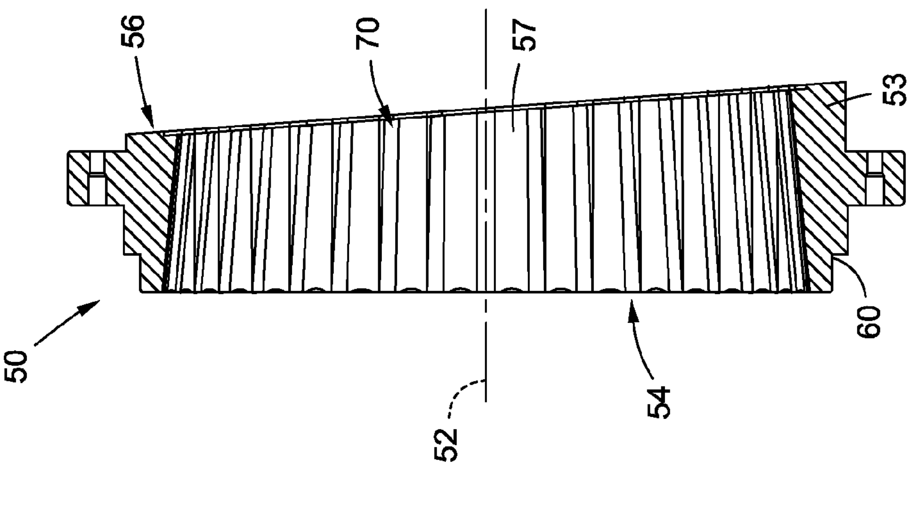
FIG. 3 is a side sectional view of the seat ring shown in FIG. 2.

The valve 10 includes one or more seat rings 50 connected to the valve body 12. Each seat ring 50 is positioned to engage with the valve plate 48. Referring now to FIGS. 2-3, each seat ring 50 is disposed about a ring axis 52 and includes an annular body 53 having opposed first and second end surfaces 54, 56 and an inner annular face 57 defining a seat ring opening 58 extending between the first and second end surfaces 54, 56. The second end surface 56 can be in a gate valve orthogonal to the valve axis or slightly angled relative to an orthogonal plane. An angled second end surface 56 typically requires the valve gate assembly to be wedge shaped.

A stepped surface 60 extends between the first end surface 54 and the second end surface 56 along the outer periphery of the seat ring 50, while the inner annular face 57 extends between the first end surface 54 and second end surface 56 on the inside of the seat ring 50. A circular flange extends radially from the stepped surface 60 and includes a plurality of apertures extending through the flange for connecting the seat ring 50 to the valve body 12. The seat ring 50 is connected to the valve body 12 as shown in FIG. 1, with the opening 58 being aligned with the fluid passageway 20 to allow fluid to pass therethrough. When connected to the valve body 12, the second end surfaces 56 of the seat rings 50 face each other and may be angled to define a "V" shape to accommodate the valve plates 48. However, it is understood that the second end surfaces 56 may be disposed in parallel relation to each other. The seat rings 50 can be connected to the valve body 12 by bolts, thread, weld, or can be an integral part of the valve body.

As described above, the valve plate 48 reciprocates axially between an open position (shown in FIG. 1) and a closed position to control the flow of fluid through the fluid passageway 20. When the valve gate assembly is in the closed position, the lateral faces 68 of the valve plate 48 are brought into contact with the second end surface 56 of the corresponding seat ring 50 to create a substantially fluid tight seal between the seat ring 50 and the valve plate 48. In order to facilitate such fluid tight engagement, the lateral faces 68 of the valve plate 48 may be angled relative to the ring axis 52 substantially the same amount as the second end surface 56. Along these lines, in embodiments where the valve plate 48 is formed of two plate halves, each plate half may be configured to pivot to between a generally orthogonal orientation relative to the ring axis 52 and an angled orientation relative to the ring axis 52 to allow the lateral face 68 to sealingly engage with the seat ring 50 to mitigate fluid flow through the seat ring 50. The valve 10 is moved to the open position by moving the valve plate 48 out of sealing engagement with the seat rings 50 and out of the fluid passageway 20. The valve 10 is moved axially between the closed position and the open position by any suitable type of linear moving actuator.

When the valve 10 is in the open position, fluid traveling through the fluid passageway 20 may undesirably generate acoustic resonance, which may cause pressure pulsations in the cavities of the gate valve 10. The acoustic resonances can be excited by shear layer instability at the gaps between the seat rings 50 and between seat rings 50 and the gate assembly. This phenomenon includes the periodic formation of vortices, which travel across the gap and impinge on the trailing edge of the side branch cavity, therefore generating a pressure pulsation. The frequency at which this pressure pulsation is generated may approach the natural acoustic frequency, i.e., quarter standing wave, of the valve cavity. If the vortex shedding frequency matches the acoustic resonant frequency, lock-in will generally occur and a quarter-standing wave will be set inside the cavity generating large pressure pulsations. Such pressure pulsations inside the cavities can also excite pressure pulsations in the flow stream through the valve 10 and result in pressure pulsations in the piping system and therefore undesirable vibration of the piping system. Such flow induced acoustic resonances can be attenuated by introducing spoilers near to the separation point of the shear layer. Such spoilers, also called vortex generators, are introduced to generate smaller vortices with smaller frequencies which do not couple with the acoustic resonant frequency of the cavity. This prevents coherent turbulent structures from forming. Such vortex generators can be placed near the shear layer separation point adjacent the leading seat edge by a modification of the upstream seat ring 50. When such vortex generators are used to attenuate the pressure pulsations in the cavity and consequently also the pressure pulsations in the piping system, higher velocities can be allowed in the gate valve 10 without causing unacceptable levels of pressure pulsation and vibration in the piping system and the valve 10. Higher velocities through the valve 10 allow eventually selection of smaller valves for a given flow.

It is understood that the resonant loop that produces high amplitude acoustics in the valve 10 generally includes four parts: (1) the fluid system produces a jet flow which includes instability waves within the shear layer of the jet flow; (2) the instability waves impinge on a downstream obstacle and produce pressure disturbances; (3) the unsteady pressure disturbances propagate upstream; and (4) through a coupling process known as receptivity, the upstream traveling acoustic waves couple with the hydrodynamic waves in the shear layer, thus closing the feedback loop.

Accordingly, several aspects of the present invention are directed toward attenuating the acoustic resonance generated by the fluid flow without significant pressure loss or reduced mass flow. To achieve that end, one embodiment of the valve 10 includes seat rings 50 having vortex generators 70 for generating streamwise vorticies which attenuate the resonance within the fluid flow. In the exemplary embodiment, the vortex generators 70 are disposed along the inner periphery of the seat ring 50 to induce streamwise vorticies within the fluid flowing through the seat ring 50. Those skilled in the art will appreciate that the vortex generators 70 may define various shapes and sizes and may be equally spaced along the seat ring 50, or unequally spaced along the seat ring 50. Furthermore, the axial placement of the vortex generators 70 along the seat ring 50 may be varied without departing from the spirit and scope of the present invention.

The vortex generators 70 are configured to break the feedback loop by the stiffing actions of the trailing vortex motions. This can suppress growing instability waves, break the correct phase relations necessary for the feedback loop to close and modify the receptivity process that is critical for strong resonance.

Figure 6B:
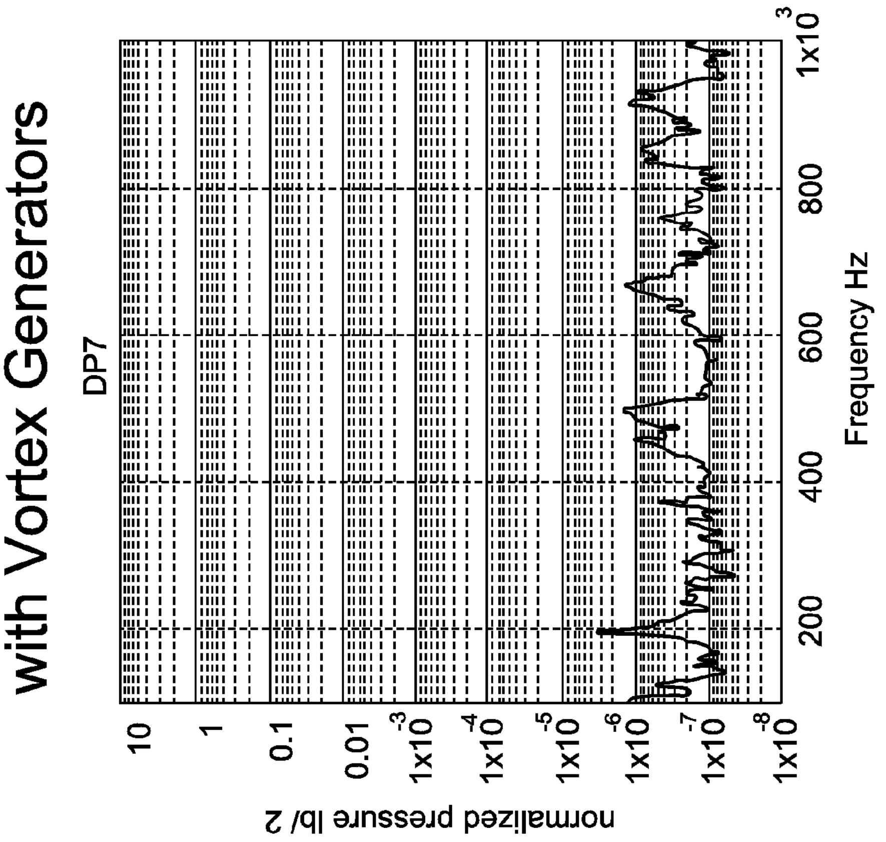
FIGS. 6A and 6B show representative suppression data for a base line system without vortex generators, and for a system including vortex generators.
Figure 6A:
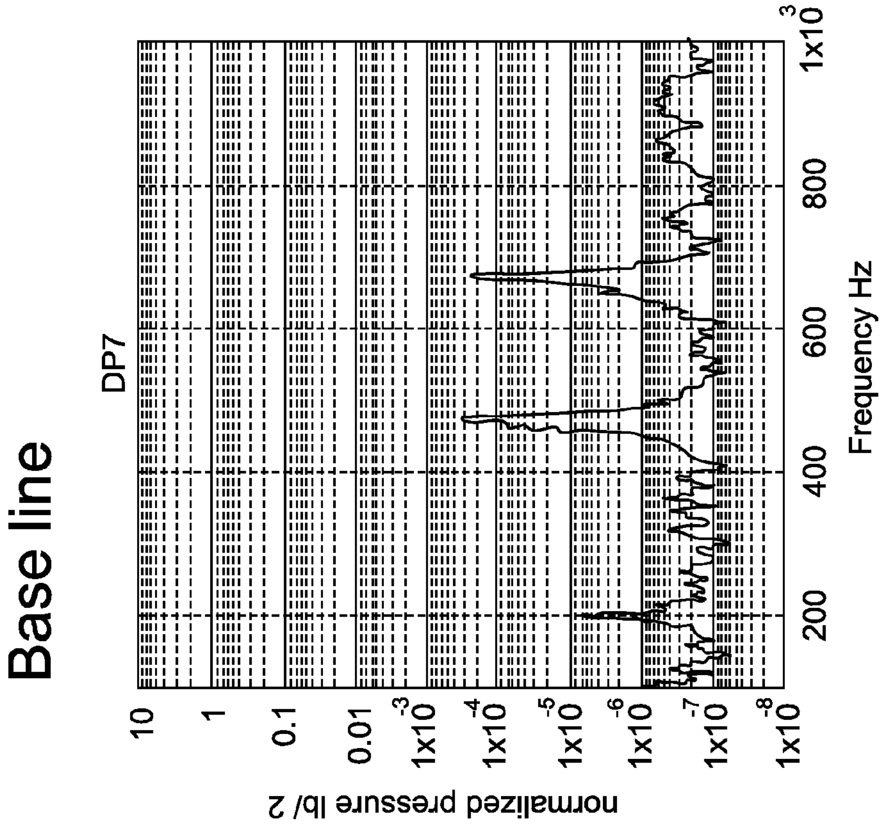
Figure 7A:
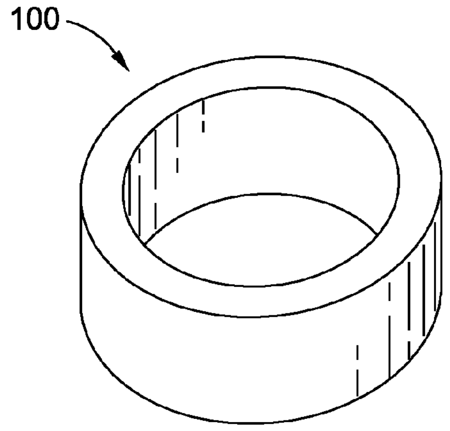
FIG. 7A is an upper perspective view of a baseline seat valve.
Figure 7B:
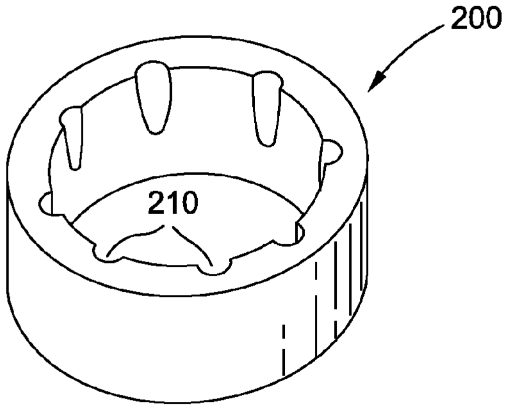
FIG. 7B is an upper perspective view of a seat valve with grooved vortex generators.
Figure 7C:
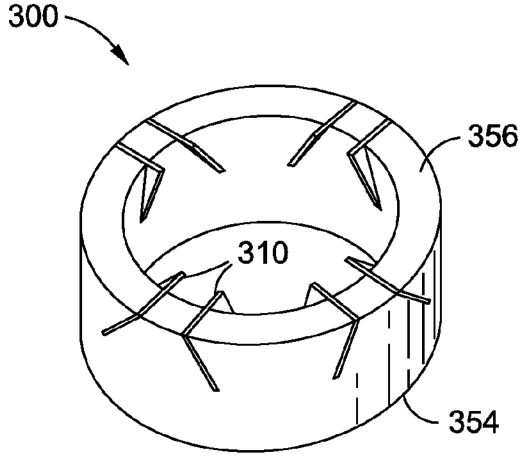
FIG. 7C is an upper perspective view of a seat valve with fin vortex generators.
Figure 7D:
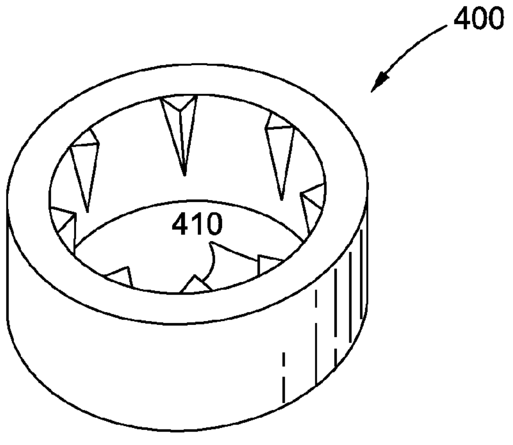
FIG. 7D is an upper perspective view of a seat valve with hump vortex generators which may be integrated into a gate valve of the present invention.

The vortex generators 70 may define several shapes and sizes. The vortex generators 70 successfully attenuate pressure pulsations up to several orders of magnitude depending on frequency and velocity. To be effective in a gate valve 10, vortex generators 70 are typically located on the upstream side of the gate valve cavities and as close as possible to the leading edge of the cavity. FIGS. 6A and 6B show the measured effect of vortex generators 70 with air flow in an actual valve model. As described in more detail below, vortex generators 70 can have different shapes and angles relative to the fluid system. Different shapes have different effectiveness regarding attenuation, but the actual shape may often be determined by available economical manufacturing technologies. The optimal number and size of the vortex generators 70 may vary depending on the size of the valve and size and shape of the cavities where the acoustic resonances occur.

According to one embodiment, the vortex generators 70 are configured to have strong streamwise vorticity generation with minimal performance penalty. The primary source of the vorticity generation is the pressure hill associated with the vortex generator 70. The pressure gradient in the z-direction, in combination with the presence of the wall of the pipe will produce a pair of streamwise vortices. The vorticies may be visualized as "rollers" rolling down the sides of the pressure hill.

There may also be a secondary source of vorticity generation. More specifically, sheets of vorticity may be shed from the sides of the vortex generator 70, which may contribute to the suppression of acoustic resonance.

Figure 5:
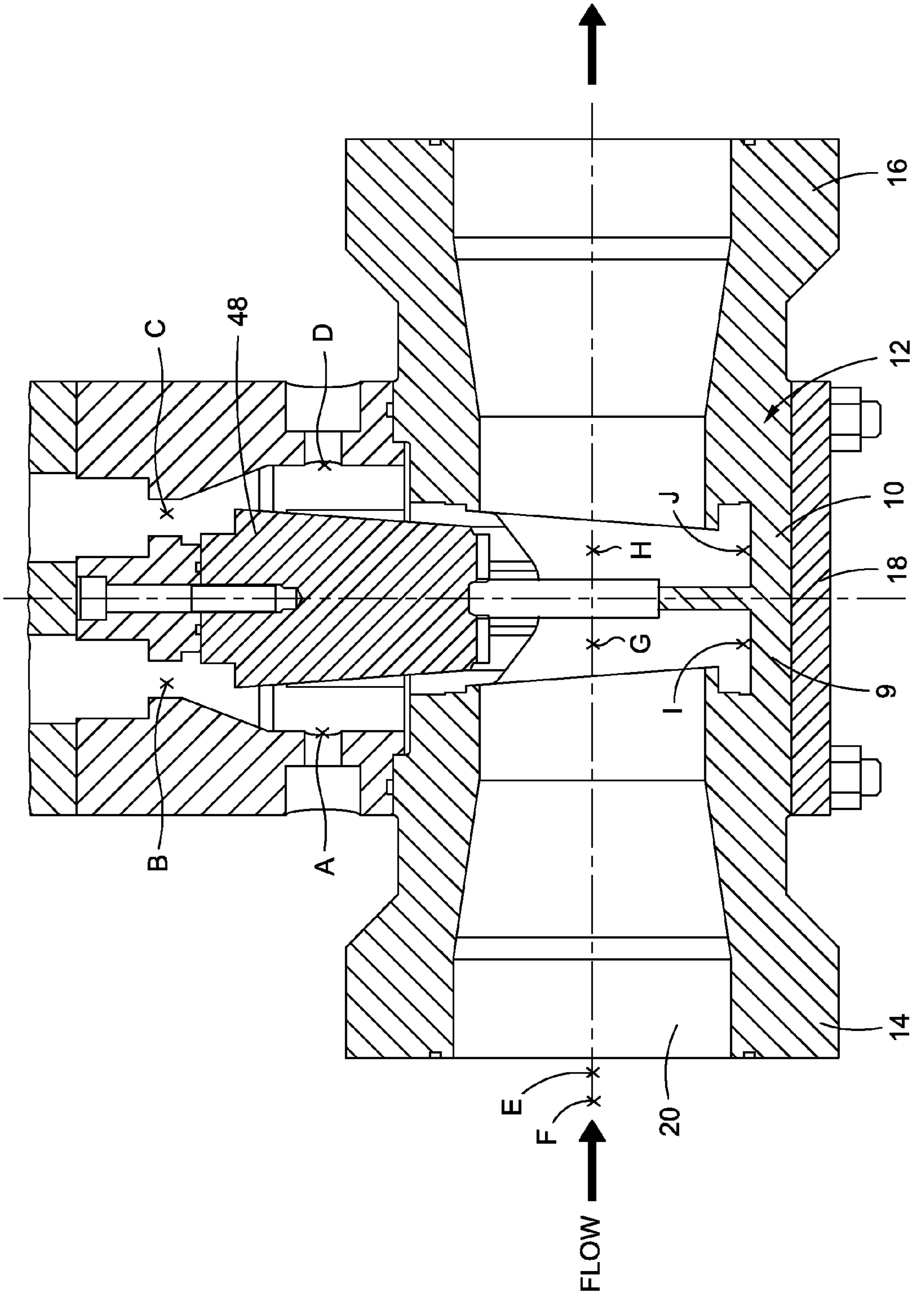
FIG. 5 is a side sectional view of a gate valve of the present invention having sensors placed at several locations throughout the valve to measure resonance.

Referring back to FIGS. 5, 6A and 6B, testing has been conducted to measure the amount of resonance suppression achieved by a gate valve 10 having vortex generators 70 disposed within the fluid flow. FIG. 5 is a side sectional view of the gate valve 10 having sensors A-J disposed therein for measuring acoustic resonance. FIG. 6A shows the baseline measurements of acoustic resonance (i.e., the acoustic resonance generated in the valve 10 without vortex generators 70) and FIG. 6B shows the measurements of acoustic resonance within a valve 10 having vortex generators 70. As can be seen, the data in FIGS. 6A and 6B shows suppression of acoustic resonance when vortex generators are used.

As described in more detail below, the vortex generators 70 may define several shapes and sizes, including, but not limited to ribs, tabs, notches, humps, grooves, and fins. In the embodiment depicted in FIGS. 1-4, each vortex generator 70 includes an elongate rib having opposed, substantially planar first and second surfaces 71, 73, which extend in spaced, generally parallel relation to each other. A third surface 75 extends between the first and second surfaces 71, 73 and at a prescribed angle relative to the annular face 57. The vortex generators 70 protrude from the annular face 57 of the annular body 53 into the seat ring opening 58. The vortex generators 70 each protrude radially from the annular face toward the axis 52 so as to be of a prescribed height, and along the axis 52 so as to be of a prescribed length. The exemplary vortex generators 70 define a length that extends from the first end surface 54 to the second end surface 56, although other embodiments may include a vortex generator 70 having a length which extends from the first end surface 54, but terminates inwardly relative to the second end surface 56, i.e., similar to the vortex generators shown in FIGS. 7-10 and discussed below. The vortex generators 70 may be shaped such that the height thereof varies along the length thereof. Furthermore, the vortex generators 70 may be disposed in equidistantly spaced relation to each other along the annular face 57. Alternatively, the vortex generators 70 may be arranged in a non-equidistantly spaced configuration relative to each other. As shown in FIGS. 1-4, the vortex generators 70 are integrally formed with the annular body 53, although it is understood that in other embodiments, the vortex generators 70 may be formed separately from the annular body 53.

FIGS. 7A-7D shows four different seat rings, specifically, seat ring 100 formed without vortex generators, seat ring 200 having groove type vortex generators 210, seat ring 300 having fin type vortex generators 310 and seat ring 400 having hump type vortex generators 410. The various vortex generators 210, 310, 410 induce different types of vorticies within the fluid flow and may be integrated into the valve 10 to achieve desired flow characteristics.

Figure 8A:
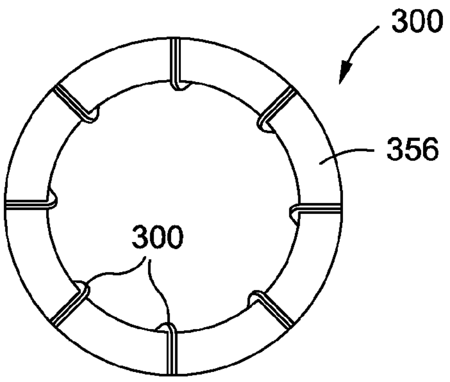
FIGS. 8A-E depict various seat rings with differing fin-type vortex generator designs as may be integrated into a gate valve of the present invention.
Figure 8B:
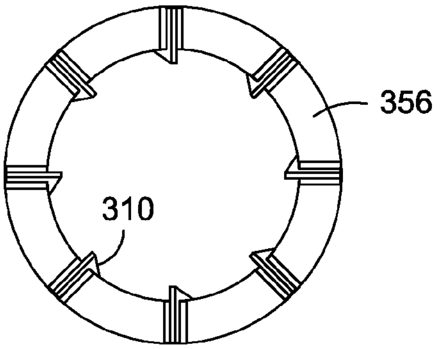
Figure 8C:
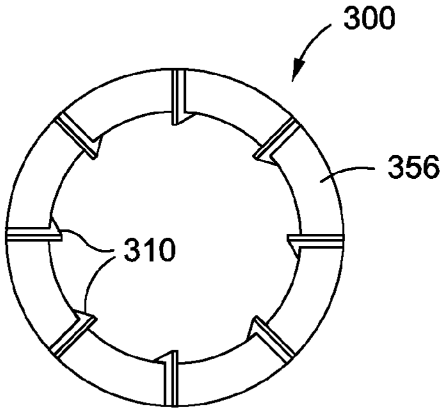

FIGS. 8A-E shows several seat rings 300 having fin type vortex generators 310 connected to the seat rings 300 having a first end surface 354 (see FIG. 7C) and a second end surface 356. More specifically, FIG. 8A shows a plurality of fin type vortex generators 310 that are equally spaced about the periphery of the seat ring 300. The vortex generators 310 extend longitudinally (i.e., along the seat ring 300) in a generally parallel direction. The vortex generators 310 are "shallow" and only extend a small amount in a radial direction toward the center of the seat ring 300. FIGS. 8B and 8C show seat rings 300 with vortex generators 310 that extend "deeper" into the opening defined by the seat ring 300. The vortex generators 310 are angled relative to the seat ring 300 such that the distal end of the vortex generator 310 (i.e., the end of the vortex generator 310 adjacent the second end surface 356 of the seat ring 300) extends a greater radial distance than the medial end of the vortex generator 310 (i.e., the end of the vortex generator 310 farthest from the second end surface 356 of the seat ring 300). Furthermore, the vortex generators 310 extend along their length only partially between the first end surface 354 and the second end surface 356.

Figure 8D:
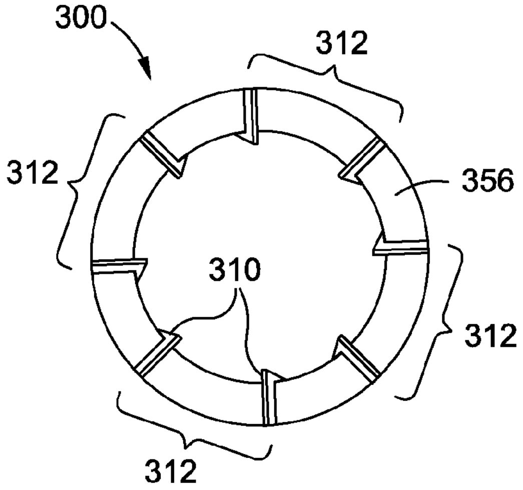
Figure 8E:
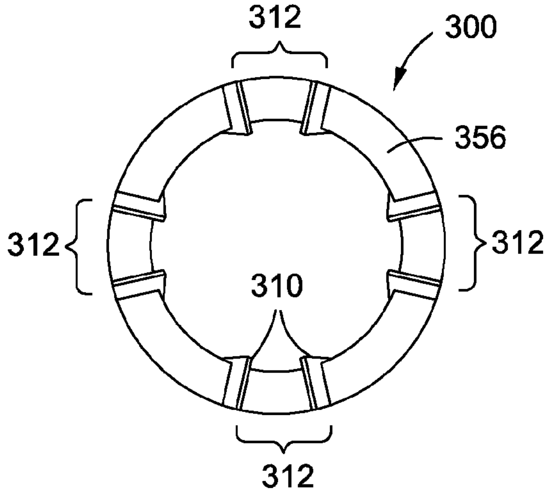

Referring now specifically to FIGS. 8D and 8E, the fin type vortex generators 310 are connected to the seat ring 300 to define contra-rotating vorticies. More specifically, the vortex generators 310 are arranged in fin pairs 312, with the fins 310 in each pair 312 being angled toward each other to generate contra-rotating vortices. As described in more detail below, the vortex generators may be arranged along a seat ring for generating contra-rotating vorticies. It is also contemplated that the vortex generators may be arranged to define co-rotating vortices, as shown in FIGS. 8A-8C.

Figure 9A:
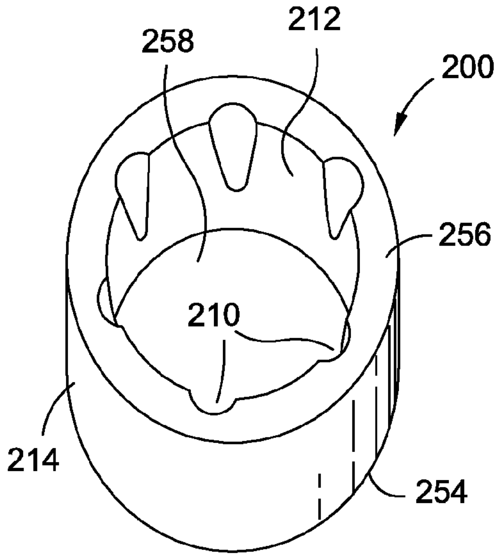
FIG. 9A-C shows seat rings with grooved vortex generators as may be integrated into a gate valve of the present invention.
Figure 9B:
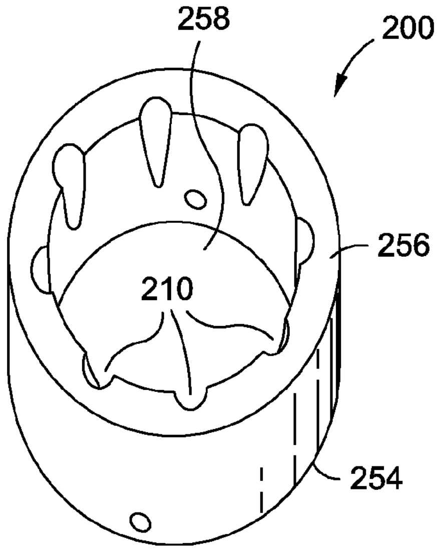
Figure 9C:
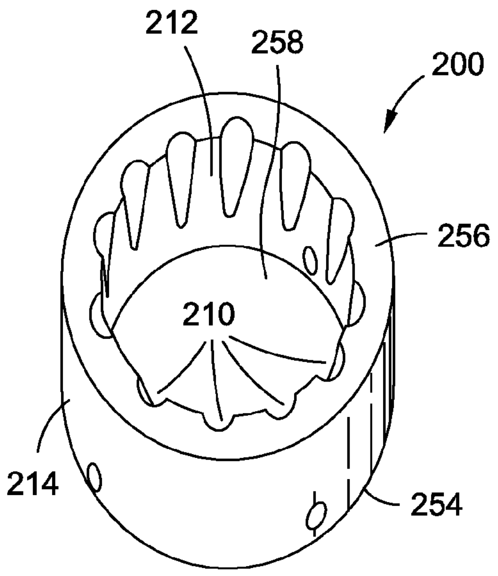
Figure 10A:
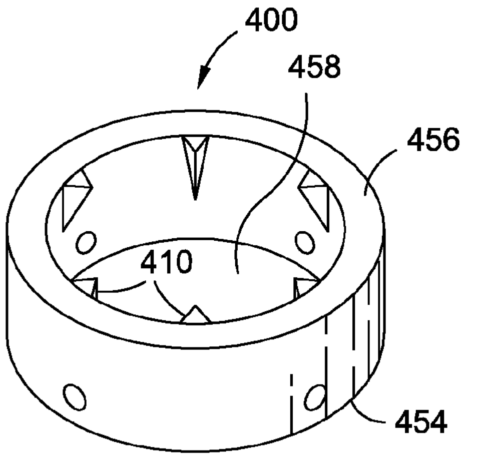
FIG. 10A-D shows seat rings with hump vortex generators as may be integrated into a gate valve of the present invention.
Figure 10B:
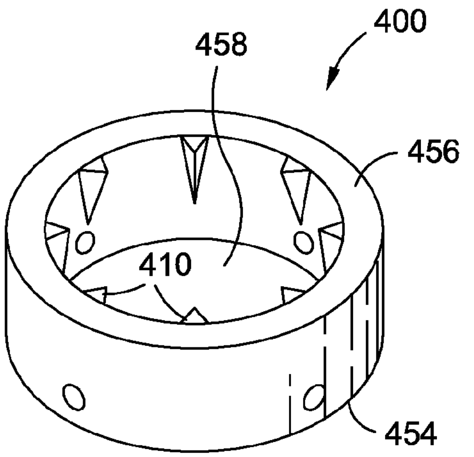
Figure 10C:
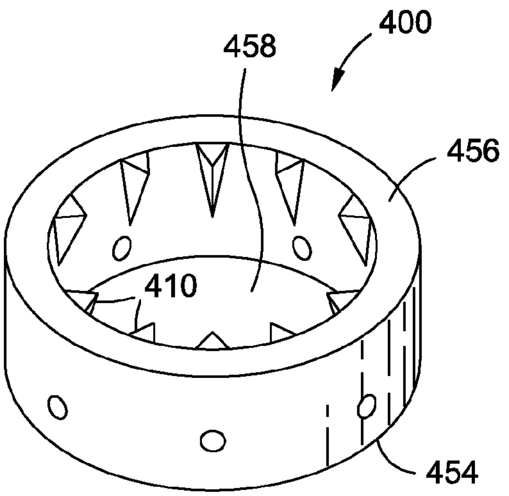
Figure 10D:
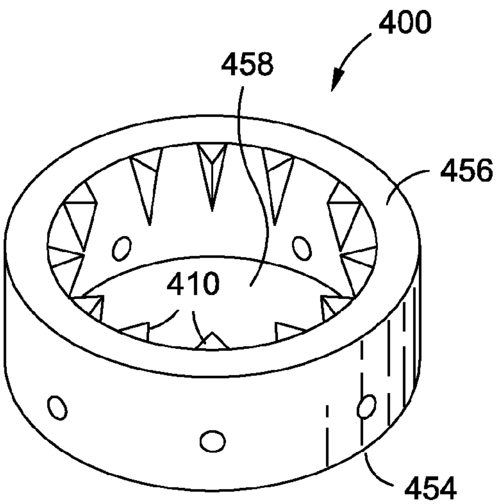

FIGS. 9A-9C show several seat rings 200 having groove type vortex generators 210. The seat rings 200 defines opposed first and second end surfaces 254, 256, an inner annular face 212 and an outer face 214 extending between the first and second end surfaces 254, 256. The vortex generators extend into the annular face 212 so as to be of a prescribed depth, and extend along and in spaced relation to the axis so as to be of a prescribed length. The depth and shape of the grooves 210 may be varied to achieve desired flow characteristics. The groove type vortex generators 210 are configured to generate spanwise vorticity due to the localized "diffuser" type flow in the grooves. Co-flowing "nozzle-diffuser" streams produce a circumferential velocity gradient.

In the embodiments shown in FIGS. 9A-9C, the grooves 201 are substantially arcuate and have a tapering depth (i.e., the distance that the groove extends from the inner wall 212 toward the outer wall 214), with the depth being the deepest at the end of the seat ring 200.

The primary distinction between the seat rings 200 shown in FIGS. 9A-9C is the number of groove type vortex generators 210 formed within each seat ring 200, and the spacing between the vortex generators 210. More specifically, the seat ring 200 shown in FIG. 9A includes the fewest number of vortex generators 210 (relative to the embodiments shown in FIGS. 9B and 9C; seat rings 200 with fewer vortex generators 210 than that shown in FIG. 9A are also contemplated) with the greatest amount of spacing between the vortex generators 210. FIG. 9C includes the greatest number of vortex generators 210 (relative to the embodiments shown in FIGS. 9A and 9B; seat rings 200 with more vortex generators 210 than that shown in FIG. 9C are also contemplated) with the smallest amount of spacing between the vortex generators 210. FIG. 9B includes a seat ring 200 with more vortex generators 210 than the embodiment shown in FIG. 9A and fewer vortex generators 210 than the embodiment shown in FIG. 9C.

FIGS. 10A-D shows a plurality of seat rings 400 having hump type vortex generators 410. The seat rings 400 include a first end surface 454, a second end surface 456, and an opening 458, with the hump type vortex generators extending into the opening 458. The hump type vortex generators 410 are configured to convert azimuthal vorticity to spanwise vorticity at the apex of the hump 410. A pair of contra-rotating vortices are generated in the space between an adjacent pair of humps.

As shown in FIGS. 10A-10D, the hump type vortex generators 410 define a triangular shape in a transverse cross sectional plane (i.e., a plane substantially orthogonal to the longitudinal length of the hump 410). The hump type vortex generators 410 have a tapered height increasing with the flow direction and the height being the greatest close to the leading edge of the cavity where pressure pulsations are to be attenuated. Those skilled in the art will understand that the size, number, shape, and spacing between the hump type vortex generators 410 may be varied without departing from the spirit and scope of the present invention.

The size and shape of the streamwise vortices may be altered by varying the number of vortex generators around the pipe. If the number of vortex generators is increased, the pairs of streamwise vortices begin to communicate with each other and ultimately merge. For instance, an amalgamation may occur wherein a six vortex generator configuration may appear similar to that of a three vortex generator configuration. Accordingly, the tendency of the streamwise vorticies to merge should be considered when selecting the optimal number of vortex generators.

It may be desirable to generate co-rotating or counter-rotating streamwise vorticies. The vortex generators may be formed or positioned along the seat ring to generate co-rotating streamwise vorticies or counter-rotating streamwise vorticies. To generate counter-rotating streamwise vorticies, the plurality of vortex generators may be arranged in angularly offset pairs (See FIG. 8D-8E). In each pair, one of the vortex generators is offset in a first radial direction from the direction of fluid flow, while the other vortex generator is offset in a second radial direction from the direction of fluid flow. Each vortex generator may be offset from the direction of fluid flow by the same magnitude, albeit in different radial directions.

To generate co-rotating streamwise vorticies, the plurality of vortex generators may be disposed along the seat ring in spaced, parallel relation to each other. The vortex generators may be equally spaced along the seat ring and angularly offset by the same amount and in the same radial direction relative to the direction of fluid flow (See FIGS. 8A-8C).

Figure 4:
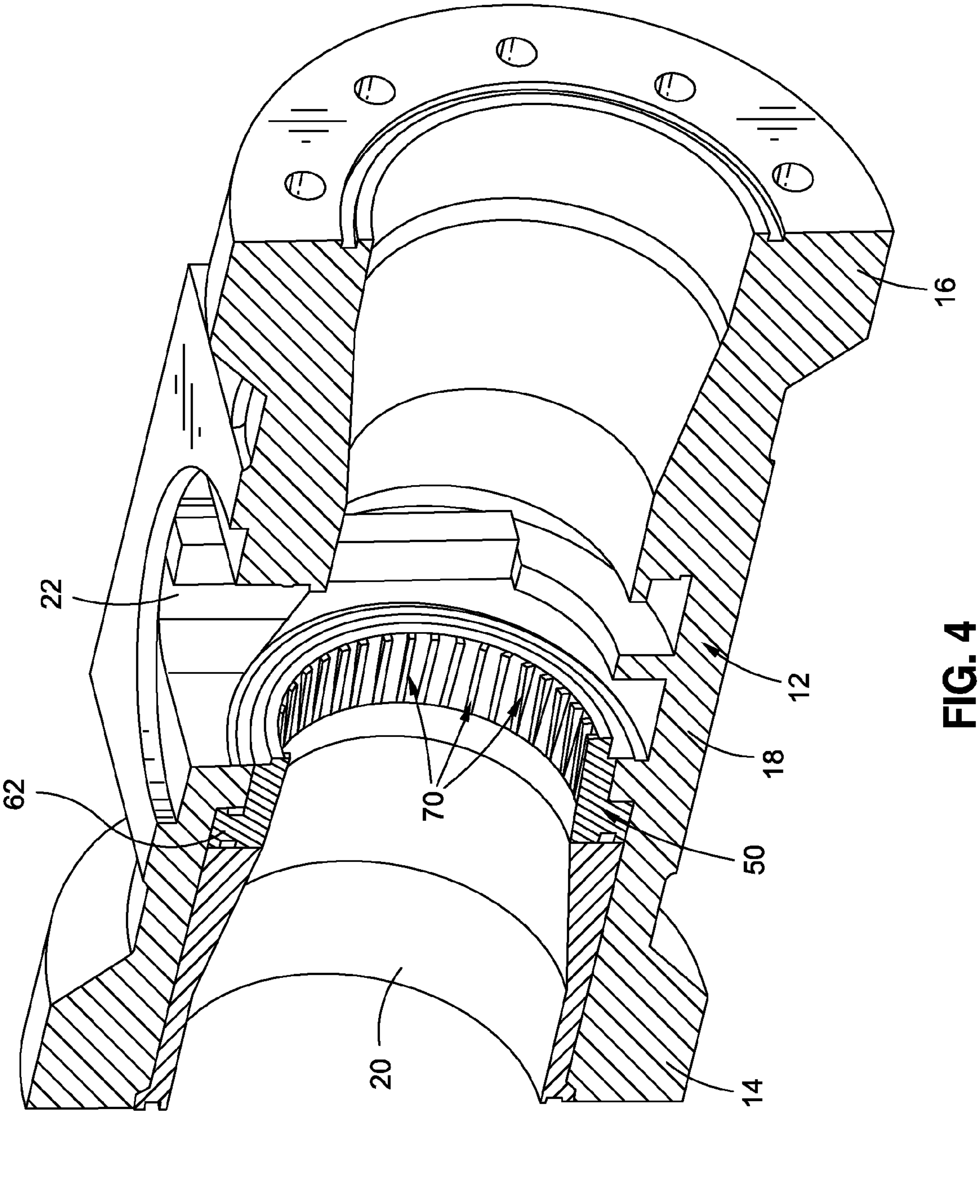
FIG. 4 is an upper perspective view of a valve body of a gate valve of the present invention, depicting a seat ring connected thereto.

Referring again to FIGS. 2-4, there is depicted an exemplary embodiment of a seat ring 50 having fin-type vortex generators 70 for imparting streamwise vorticities within the gate valve 10. More specifically, FIGS. 2-3 depict various views and features of the seat ring 50 and the fin-type vortex generators 70, while FIG. 4 shows the seat ring 50 integrated into the gate valve 10. Although the exemplary embodiment of the seat ring 50 shown in FIGS. 2-3 includes fin-type vortex generators 70, those skilled in the art will appreciate that the seat ring(s) 50 disposed within the gate valve 10 may additionally include the vortex generators 70 discussed above (i.e. groove-type, hump-type). Along these lines, although the various species of vortex generators 70 discussed above (i.e., fin-type, hump-type, groove-type) were discussed in relation to a pipe, it is understood that the various species of vortex generators 70 may be employed on a seat ring 50 or other elements of the fluid control system (i.e., formed along the inner surface of a pipe). In other words, seat rings 50 having hump-type vortex generators or groove-type vortex generators may additionally be employed. Furthermore, it is also contemplated that the seat ring 50 may include a uniform species of vortex generators 70 (i.e., only fin-type, only groove-type, or only hump-type, etc.), or alternatively, the seat ring 50 may include a combination of species of the vortex generator 70. For instance, one embodiment of the seat ring 50 may include fin-type vortex generators 70 and groove-type vortex generators 70. The selection of the species of vortex generators 70 may be based on the type of vorticies that will most effectively attenuate the acoustic resonance within the system taking into account the fluid flowing through the system, the flow rate of the fluid through the system, the size of the flow path, and other variables known by those skilled in the art.

The exemplary seat ring 50 shown in FIGS. 2-3 includes a plurality of fin-type vortex generators 70 disposed about the inner periphery thereof. The fin-type vortex generators 70 are equally spaced around the inner periphery of the seat ring 50. Those skilled in the art will appreciate that the number of vortex generators 70 and the spacing between the vortex generators 70 may be varied without departing from the spirit and scope of the present invention. Each vortex generator 70 is arranged longitudinally in a direction that is substantially parallel to the fluid flow through the seat ring 50 and extends from the first end surface 54 to the second end surface 56. The fins 70 also define a varying thickness, with the thinnest portion of the fin 70 being disposed adjacent the first end surface 54 and the thickest portion of the fin being disposed adjacent the second end surface 56.

FIG. 4 shows the seat ring 50 coupled to the valve body 12 of the gate valve 10. The seat ring 50 is arranged to be co-axially aligned with the fluid flowpath 20. As is described in more detail above, a valve gate assembly is configured to axially reciprocate through the valve body opening 22 between a closed position, wherein the valve gate assembly engages with the seat ring 50 to restrict fluid flow along the flowpath 20, and a open position, wherein the valve gate assembly is disengaged from the seat ring 50 to enable fluid flow along the flowpath 20. In the preferred embodiment shown in FIG. 4, the seat ring 50 is shown upstream of the valve body opening 22 (i.e., an “entrance seat ring”), while the ring downstream of the valve body opening 22 is blank (i.e., does not include vortex generators 70).

When the valve gate assembly is in the open position allowing fluid to flow through the flowpath 20, fluid flows through the seat ring 50 and over the fins 70 to impart streamwise vortices within the fluid flow. The streamwise vortices attenuate the acoustic resonance within the fluid flow system, thereby making the overall fluid system safer and easier to operate.

This disclosure provides exemplary embodiments of the present invention only. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A valve including a valve body having a fluid passageway extending therethrough, and at least one seat ring which is positioned within the fluid passageway and comprises:

an annular body including an inner annular face defining a seat ring opening, the annular body being cooperatively engaged to the valve body such that the seat ring opening is substantially aligned with the fluid passageway; and at least one vortex generator extending axially along the annular face only from an inlet end of the annular body and protruding radially inward from the annular face of the annular body into the seat ring opening, the at least one vortex generator being configured to induce a vortex within fluid flowing through the seat ring opening;

a majority of the annular face at the inlet end of the annular body being uncovered by the at least one vortex generator and exposed to the seat ring opening.

2. The valve of claim 1, wherein the vortex generators are sized and configured to generate co-rotating vortices within fluid flowing through the seat ring opening.

3. The valve of claim 1, wherein the vortex generators are sized and configured to generate contra-rotating vortices within fluid flowing through the seat ring opening.

4. The valve of claim 1, wherein:

the annular body includes opposed first and second end surfaces, the inner annular face extending between the first and second end surfaces; and the at least one vortex generator extends to only one of the first and second end surfaces of the annular body.

5. The valve of claim 1, wherein the at least one vortex generator comprises a plurality of vortex generators integrated into the annular face.

6. The valve of claim 5, wherein the vortex generators are disposed in equidistantly spaced relation to each other along the annular face.

7. The valve of claim 5, wherein the vortex generators extend into the annular face of the annular body.

8. The valve of claim 7, wherein:

the seat ring defines opposed first and second end surfaces, and the seat ring opening extends between the first and second end surfaces along an axis;

the vortex generators each extend into the annular face so as to be of a prescribed depth;

the vortex generators each extend along and in spaced relation to the axis so as to be of a prescribed length; and the vortex generators are each shaped such that the depth thereof varies along the length thereof.

9. The valve of claim 8, wherein each of the vortex generators extends to the first end surface, but terminates inwardly relative to the second end surface.

10. The valve of claim 1, wherein:

the seat ring defines opposed first and second end surfaces, and the seat ring opening extends between the first and second end surfaces along an axis;

the vortex generators each protrude radially from the annular face toward the axis so as to be of a prescribed height;

the vortex generators each extend along and in spaced relation to the axis so as to be of a prescribed length; and the vortex generators are each shaped such that the height thereof varies along the length thereof.

11. The valve of claim 10, wherein each of the vortex generators comprises an elongate rib having opposed, substantially planar first and second surfaces which extend in spaced, generally parallel relation to each other, and a third surface which extends between the first and second surfaces at a prescribed angle relative to the annular face.

12. The valve of claim 10, wherein each of the vortex generators is integrally formed with the annular body.

13. The valve of claim 10, wherein each of the vortex generators extends to the first end surface, but terminates inwardly relative to the second end surface.

14. The valve of claim 13, wherein each of the vortex generators is of a generally triangular cross-sectional configuration including a pair of opposed surfaces that intersect along an apex.

15. In a valve including a valve body having a fluid passageway extending therethrough and a valve plate moveable between open and closed positions relative to the valve body to control fluid flow through the fluid passageway, the improvement comprising a seat ring which includes:

an annular body including an inner annular face defining a seat ring opening which is aligned with the fluid passageway; and a plurality of vortex generators integrated into the annular face adjacent a first end of the annular body and protruding from the annular face of the annular body into the seat ring opening, the at least one vortex generator being configured to induce a vortex within fluid flowing through the seat ring opening;

a majority of the annular face at the first end of the annular body being uncovered by the at least one vortex generator and exposed to the seat ring opening.

16. The valve of claim 15, wherein the vortex generators are sized and configured to generate co-rotating vortices within fluid flowing through the seat ring opening.

17. The valve of claim 15, wherein the vortex generators are sized and configured to generate contra-rotating vortices within fluid flowing through the seat ring opening.

18. The valve of claim 15, wherein the vortex generators protrude from the annular face of the annular body into the seat ring opening.

19. The valve of claim 15, wherein the vortex generators extend into the annular face of the annular body.

20. The valve of claim 15, wherein:

the annular body includes opposed first and second end surfaces, the inner annular face extending between the first and second end surfaces; and the plurality of vortex generators each extend to only one of the first and second end surfaces of the annular body.

* * * * *